(12) United States Patent
Lin et al.

(10) Patent No.: US 11,329,464 B1
(45) Date of Patent: May 10, 2022

(54) FACEPLATE FOR USE WITH A GROUND FAULT CIRCUIT INTERRUPTER DEVICE AND RELATED GFCI ASSEMBLY

(71) Applicant: Chengli Li, Suzhou (CN)

(72) Inventors: Fei Lin, Suzhou (CN); Jiang Zhan, Suzhou (CN)

(73) Assignee: Chengli Li, Suzhou (CN)

( * ) Notice: Subject to any disclaimer, the term of this patent is extended or adjusted under 35 U.S.C. 154(b) by 65 days.

(21) Appl. No.: 17/083,240

(22) Filed: Oct. 28, 2020

(30) Foreign Application Priority Data

Oct. 16, 2020 (CN) .......................... 202022307853.3

(51) Int. Cl.
*H02G 3/14* (2006.01)
*H02G 3/08* (2006.01)

(52) U.S. Cl.
CPC ............... *H02G 3/14* (2013.01); *H02G 3/081* (2013.01)

(58) Field of Classification Search
CPC ............ H02G 3/08; H02G 3/081; H02G 3/14; H02G 3/00; H02G 3/10; H02G 3/12; H05K 5/00; H05K 5/02; H05K 5/0004; H05K 5/0204; H05K 5/0217; H05K 5/03; H01R 13/46; H01R 13/5213; H01R 13/52; H01H 9/00; H01H 9/02; H01H 9/04
USPC ........... 174/50, 53, 57, 58, 66, 67, 480, 481; 220/3.3–3.9, 4.02; 248/906; 343
See application file for complete search history.

(56) References Cited

U.S. PATENT DOCUMENTS

| | | | | |
|---|---|---|---|---|
| 5,073,681 A * | 12/1991 | Hubben | .................. | H02G 3/14 174/66 |
| 5,180,886 A * | 1/1993 | Dierenbach | .............. | H02G 3/14 220/241 |
| 5,189,259 A * | 2/1993 | Carson | ..................... | H01H 9/02 174/57 |
| 5,723,817 A * | 3/1998 | Arenas | ..................... | H02G 3/14 220/241 |
| 7,235,739 B2 * | 6/2007 | King, Jr. | ................ | H02G 3/086 174/53 |
| 7,378,591 B2 * | 5/2008 | Dinh | ....................... | H02G 3/086 220/3.6 |
| 7,947,903 B2 * | 5/2011 | Peck | ........................ | H02G 3/14 174/67 |
| 8,148,637 B2 * | 4/2012 | Davidson | ................. | H02G 3/14 174/67 |
| 8,686,287 B1 * | 4/2014 | Gretz | ..................... | H02G 3/123 439/535 |

* cited by examiner

*Primary Examiner* — Angel R Estrada
(74) *Attorney, Agent, or Firm* — Chen Yoshimura LLP

(57) ABSTRACT

A faceplate for use with a GFCI (ground fault circuit interrupter) device, where the faceplate includes resilient features such as snaps to affix the faceplate to a height extension shell. The height extension shell accommodates a part of the GFCI device. The faceplate has an opening that exposes at least a part of the GFCI device. By using resilient snaps to affix the faceplate, instead of using screws as in conventional GFCI assemblies, this GFCI assembly makes installation more convenient, saves installation time, and makes the faceplate easier to clean and maintain. It also enhances esthetic without sacrificing function.

5 Claims, 8 Drawing Sheets

FACEPLATE FOR USE WITH A GROUND FAULT CIRCUIT INTERRUPTER DEVICE AND RELATED GFCI ASSEMBLY

BACKGROUND OF THE INVENTION

Field of the Invention

This invention relates to electrical appliances, and in particular, it relates to a faceplate for use with a ground fault circuit interrupter (GFCI) device and a related GFCI assembly.

Description of Related Art

When installing ground fault circuit interrupter (GFCI) devices into a wall, the built-in free space inside the wall is sometimes not sufficient to accommodate the GFCI device, in which case a height extension shell is used in conjunction with the GFCI device. Conventionally, the GFCI and the height extension shell are mounted to the wall using screws, and the faceplate is affixed to the height extension component. Conventional GFCI faceplates require screws to install, and the screwheads are exposed. This affects the esthetics and also makes is inconvenient to install. When installing the faceplate, insufficient tightening of the screws may cause the faceplate to become loose, while over-tightening may cause the faceplate to crack.

SUMMARY

Accordingly, in one aspect, the present invention provides a faceplate for use with a GFCI device, where the faceplate includes a front plate and a snap feature joined to the plate feature and configured to affix the faceplate to a height extension shell. The height extension shell is configured to accommodate a part of the GFCI device. The faceplate defines an opening that exposes at least a part of the GFCI device.

In one embodiment, the snap feature includes a plurality of resilient snaps with hooks, and the height extension shell includes a plurality of corresponding snap retaining recesses, where the snaps and the snap retaining recesses engage with each other to affix the faceplate to the height extension shell.

In another aspect, the present invention provides a GFCI assembly, which includes: a GFCI device; a height extension shell, configured to accommodate a part of the GFCI device; and a faceplate, which includes a plurality of resilient snaps configured to affix the faceplate to the height extension shell, wherein the faceplate defines an opening that exposes at least a part of the GFCI device.

In one embodiment, each resilient snap include a deformable prong with a hook at its end, and wherein the height extension shell includes a plurality of corresponding snap retaining recesses, and wherein the snaps and the snap retaining recesses engage with each other to affix the faceplate to the height extension shell.

In one embodiment, the height extension shell further includes a resilient support structure configured to hold the GFCI device disposed within the height extension shell and restrain its movement relative to the height extension shell.

In one embodiment, the GFCI device is threadedly affixed to the height extension shell.

In one embodiment, the height extension shell is adapted to be threaded affixed to a wall.

In the above described embodiments, snap components on the back of the faceplate are used to affix the faceplate to the height extension shell, instead of using screws as in conventional GFCI assemblies. This makes installation more convenient, saves installation time, and makes the faceplate easier to clean and maintain. It also enhances esthetic without sacrificing function. Further, a resilient support structure is provided on the height extension shell, to restrain the movement of the GFCI device during installation, making is easier to install.

BRIEF DESCRIPTION OF THE DRAWINGS

Preferred embodiments of the present invention are described with reference to the drawings. These drawings serve to explain the embodiments and their operating principle, and only illustrate structures that are necessary to the understanding of the principles of the invention. These drawings are not necessarily to scale. In the drawings, like features are designated by like reference symbols.

DETAILED DESCRIPTION OF PREFERRED EMBODIMENTS

Figure 1:
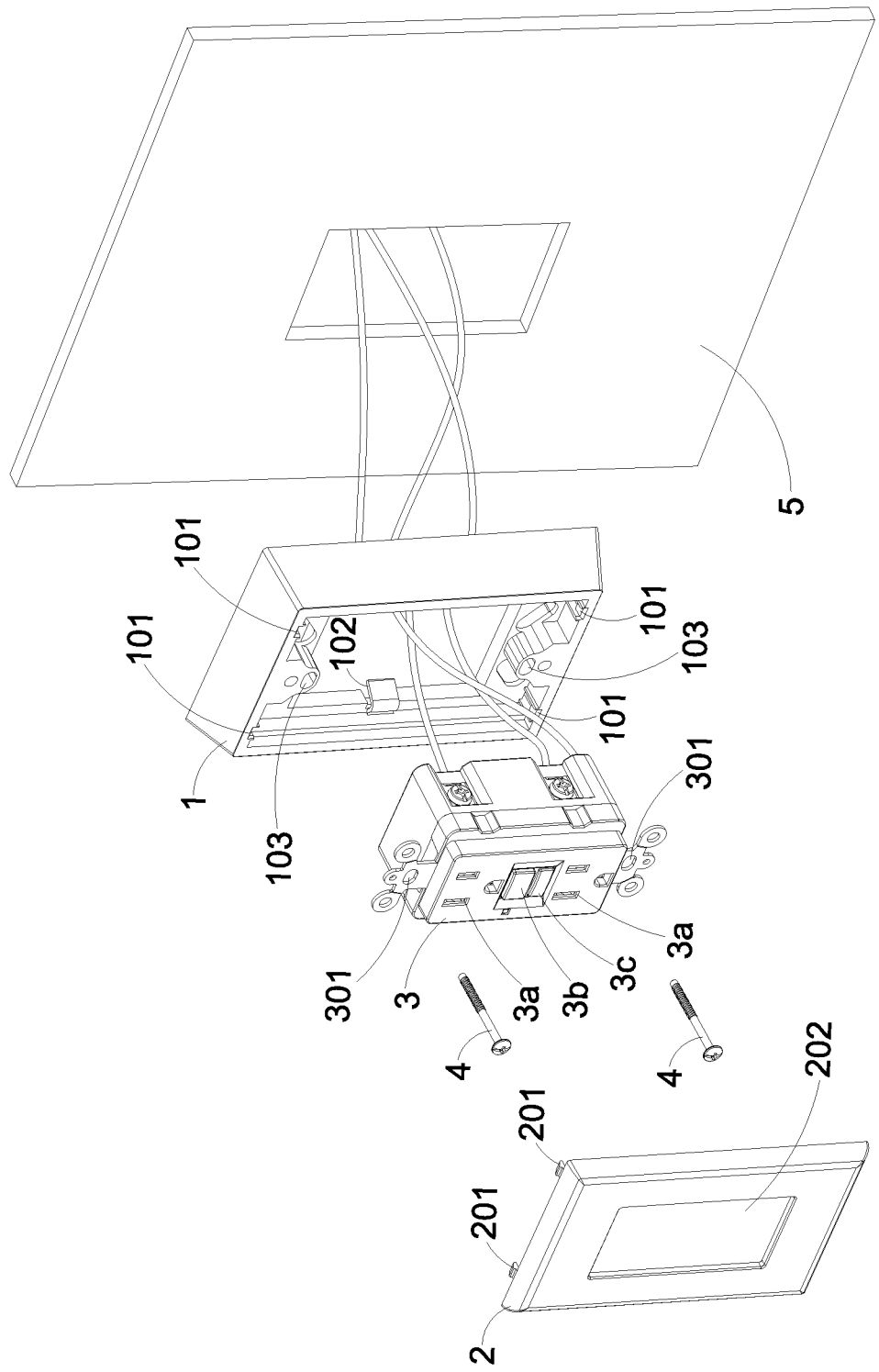
FIG. 1 is an exploded view of a GFCI assembly according to an embodiment of the present invention.

Preferred embodiments of the present invention are described below with reference to the drawings. These drawings and descriptions explain embodiments of the invention but do not limit the invention. The described embodiments are not all possible embodiments of the present invention. Other embodiments are possible without departing from the spirit and scope of the invention, and the structure and/or logic of the illustrated embodiments may be modified. Thus, it is intended that the scope of the invention is defined by the appended claims.

In the descriptions below, terms such as "including" are intended to be open-ended and mean "including without limitation", and can include other contents. "Based on" means "at least partly based on." "An embodiment" means "at least one embodiment." "Another embodiment" means "at least another embodiment," etc.

Embodiments of the present invention provide a GFCI assembly, which includes a faceplate, a GFCI device, and a height extension shell. The GFCI device is partially disposed within the height extension shell. The faceplate includes snap to affix the faceplate to the height extension shell. The faceplate has an opening that exposes at least a part of the GFCI device.

An embodiment of the present invention is described in detail with reference to FIGS. 1-8. The assembly may be used in a variety of applications, such as houses, recreational vehicles, etc.

As shown in FIGS. 1-8, the GFCI assembly 10 includes a height extension shell 1, a faceplate 2 and a GFCI device 3. The GFCI device 3 may have any suitable mechanical and electrical structures which are known in the art. The height extension shell 1 and the faceplate 2 may be made of plastic materials. The faceplate 2 serves to cover portions of the GFCI device 3 and the interior of the height extension shell 1 and also enhances the esthetics of the assembly. The faceplate 2 has a flat front plate, and optionally a low side wall around the front plate. The shell 1 has a side wall on four sides that defines a hollow space in the center, and is open on both the front and the back. When installing the assembly, the GFCI device 3 is partially disposed inside the hollow space of the height extension shell 1 (and may protrude out of the back side of the height extension shell 1, see FIGS. 7 and 8). The faceplate 2 has a number of (e.g. four) resilient snaps 201, and the height extension shell 1 has a number of (e.g. four) corresponding snap retaining recesses 101 which cooperate with the snaps 201. The faceplate 2 may be affixed to the height extension shell 1 by the cooperation of the snaps 201 and snap retaining recesses 101. It should be understood that the number of the snaps 201 and snap retaining recesses 101 may be any suitable number, depending on practical needs.

In the illustrated embodiment, each snap 201 is a resilient prong extending from the back side of the faceplate 2 toward the height extension shell 1, the prong being slightly deformable (bendable), with a slanted surface and a hook at its end. Each snap retaining recess 101 is located on an inside surface of a side wall of the height extension shell 1, so that the hook of the snap 201 can fall into the recess and be engaged by the edge of the recess to retain the hook in the recess. In other embodiments, the snaps 201 and the snap retaining recesses 101 may be replaced by other suitable snap components, so long as they are configured to affix the faceplate 2 to the height extension shell 1 using resilient components and without using screws.

Figure 2:
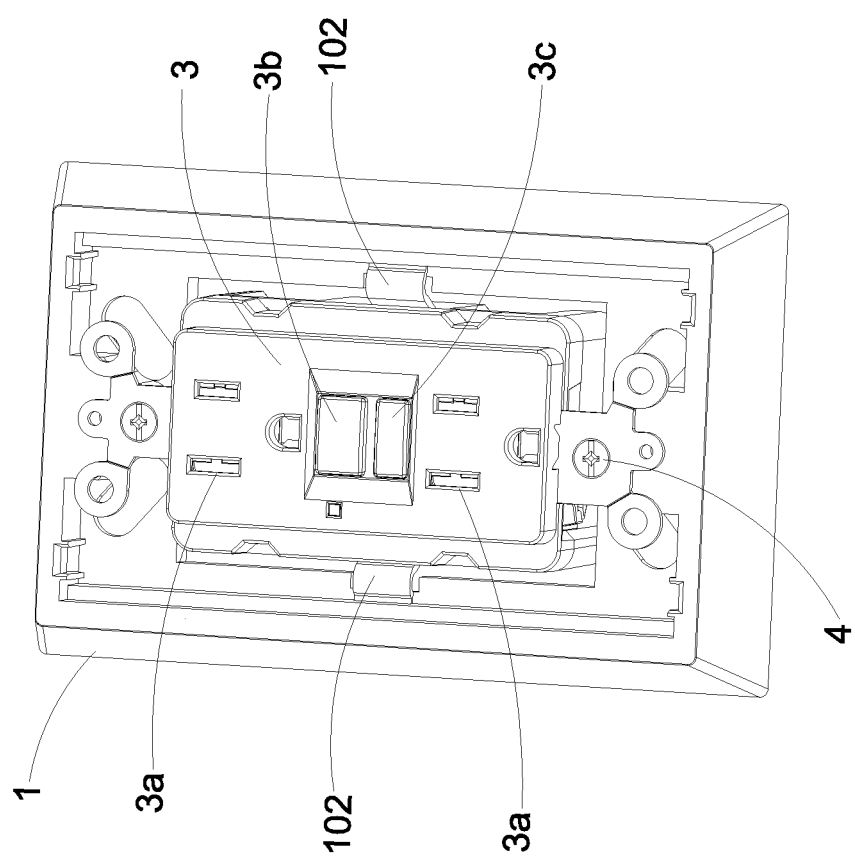
FIG. 2 shows the GFCI device installed in a height extension shell in the embodiment of FIG. 1.
Figure 3:
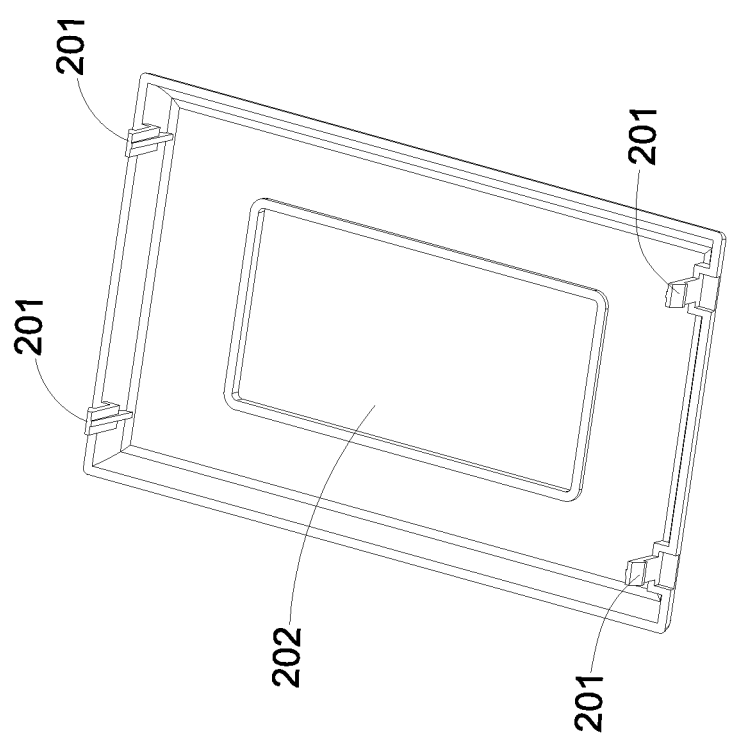
FIG. 3 is a rear view of the faceplate of FIG. 1.

As shown in FIG. 2, the GFCI device 3 includes receiving slots 3a for receiving prongs of electrical plugs, a reset button 3b, and a test button 3c. As shown in FIGS. 1 and 3, the faceplate 2 has an opening 202 which exposes at least the receiving slots 3a, the reset button 3b and the test button 3c of the GFCI device 3. This allows the user to insert electrical plugs into the receiving slots 3a, and to operate the reset button 3b to reset the device and operate the test button 3c to test the device, from the front of the faceplate 2. It should be understood that the number of receiving slots 3a may be any suitable number depending on practical needs, and the size of the front opening 202 may be changed based on practical need.

Figure 4:
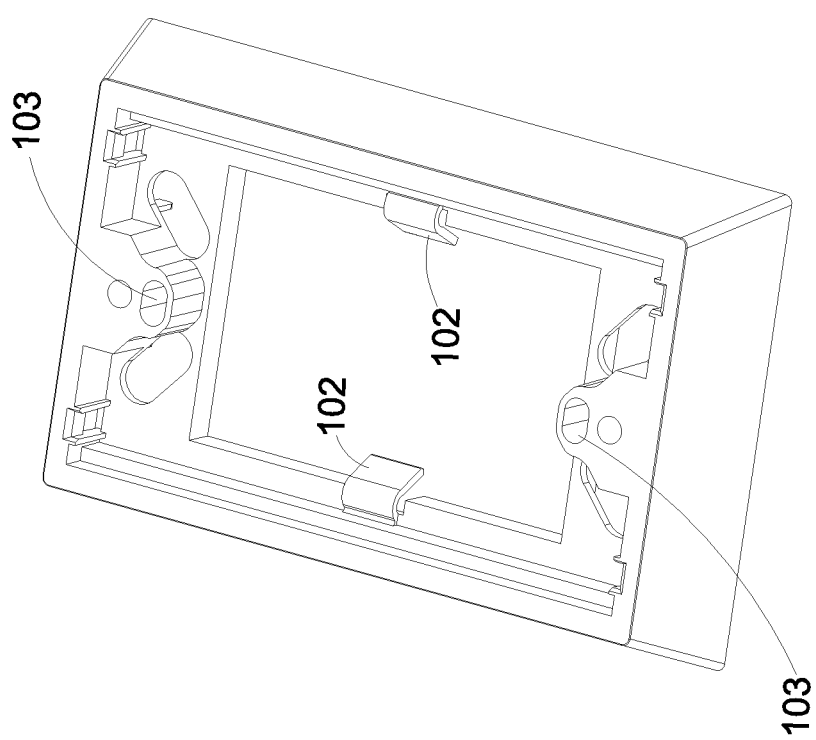
FIG. 4 is a perspective view the height extension shell of FIG. 1.
Figure 5:
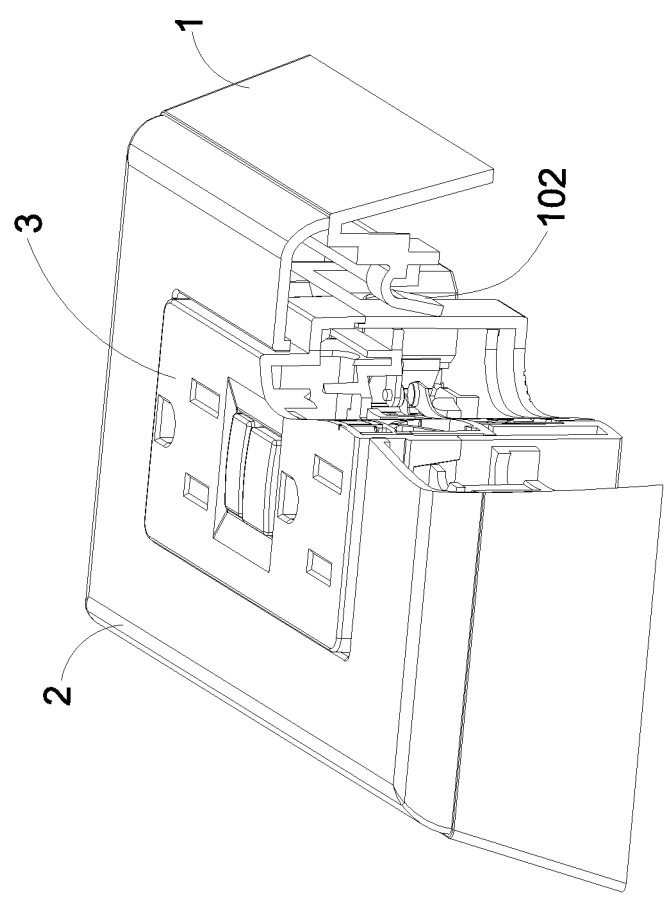
FIG. 5 is a partial cut-away view of the installed GFCI assembly in the embodiment of FIG. 1.
Figure 6:
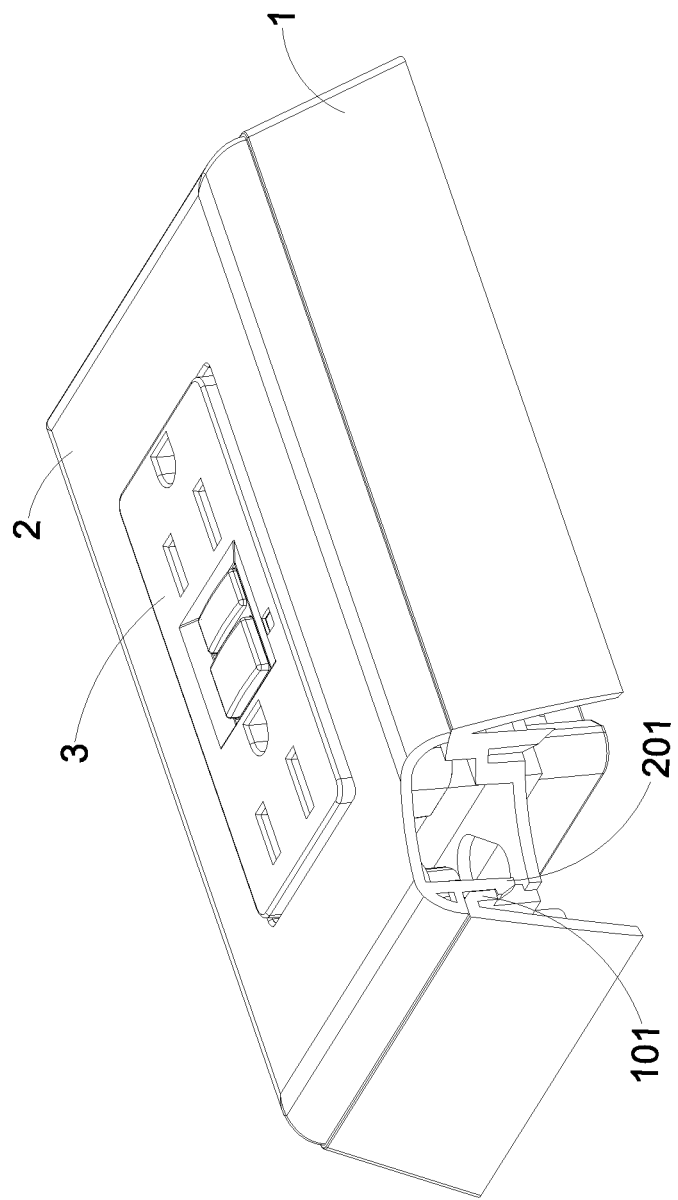
FIG. 6 is another partial cut-away view of the installed GFCI assembly of FIG. 5.
Figure 7:
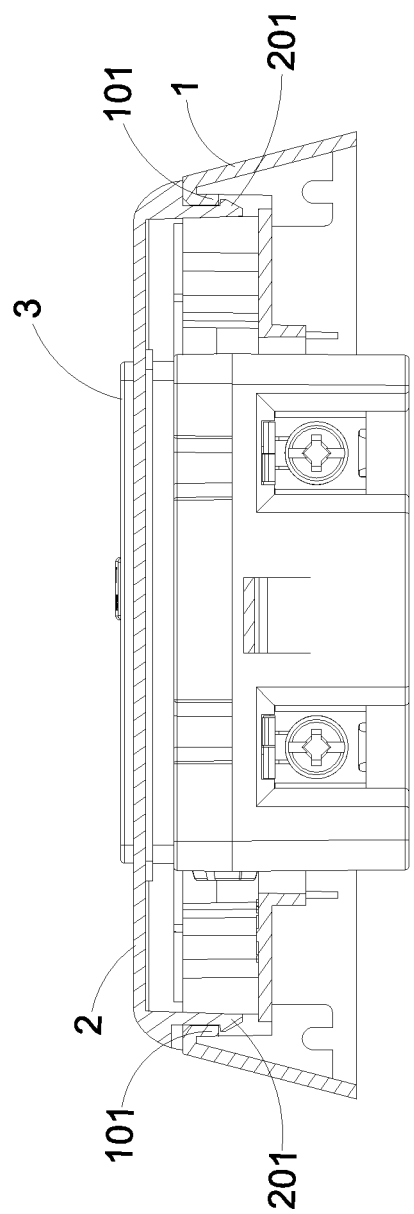
FIG. 7 is a cross-sectional view of the installed GFCI assembly of FIG. 5.
Figure 8:
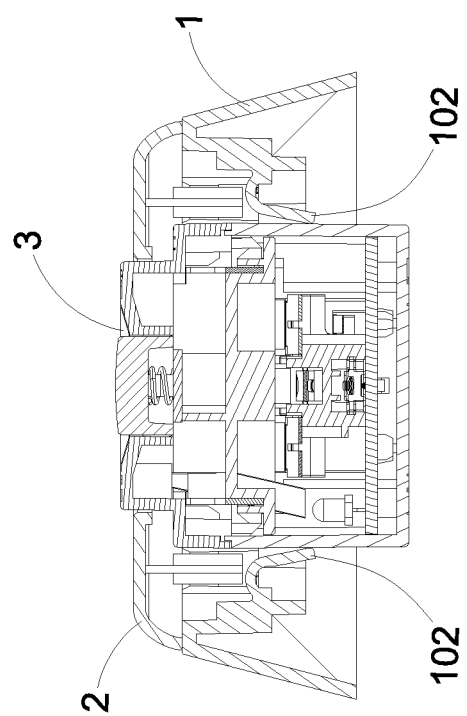
FIG. 8 is another cross-sectional view of the installed GFCI assembly of FIG. 5.

Continue to refer to FIGS. 1, 2, 4 and 5, the height extension shell 1 further includes a resilient support structure 102, which functions to restrain the position and movement of the GFCI device 3 relative to the height extension shell 1 during installation to facilitate easy installation. When the GFCI device 3 is pushed into the height extension shell 1, the support structure 102 holds the GFCI device 3 in place at its intended location, and allows the installation holes 301 on the GFCI device 3 to be aligned with the corresponding threaded holes 103 of the height extension shell 1, so that screws 4 can be easily inserted into the installation holes 301 and corresponding threaded holes 103 to affix the GFCI device 3 to the height extension shell 1. In the illustrated embodiment, as shown in FIGS. 4 and 5, the support structure 102 includes multiple resilient arms located on the side of the height extension shell 1, which press against the side of the GFCI device 3. The resilience of the arms allows the user to push the GFCI device 3 sideways slightly if needed in order to precisely align the installation holes 301 with the threaded holes 103. It should be understood that the support structure 102 may be implemented by other suitable structures. The numbers of the installation holes 301 and threaded holes 103 may be changed based on practical need. The holes 103 may alternatively be unthreaded.

When installing the GFCI assembly 10, first, the GFCI device 3 is inserted into the height extension shell 1 and held by the support structure 102, so that the installation holes 301 of the GFCI device 3 are aligned with the threaded holes 103 of the height extension shell 1. As mentioned earlier, the GFCI device 3 may be pushed sideways slightly against the support structure 102 if needed in order to precisely align the installation holes 301 with the threaded holes 103. Then, the screws 4 are inserted through the installation holes 301 of the GFCI device 3 and the threaded holes 103 of the height extension shell 1, and screwed to corresponding threaded holes in the wall 5, so that the GFCI device 3 and height extension shell 1 are both mounted to the wall 5. Note that for this purpose, the holes 103 are not required to be threaded. Lastly, the faceplate 2 is installed, by pushing the faceplate 2 against the height extension shell 1 so that the snaps 201 are engaged with the corresponding snap retaining slots 101, thereby affixing the faceplate 2 to the height extension shell 1. It should be understood that in another embodiment, the GFCI device 3 may be first affixed to the height extension shell 1 (e.g., via one set of threaded holes on the height extension shell 1), and then the height extension shell 1 alone is mounted to the wall 5 (e.g., via another set of holes on the height extension shell 1). In yet another embodiment, the height extension shell 1 may be mounted onto the wall 5 first, and then the GFCI device 3 is mounted to the height extension shell 1.

The GFCI assembly 10 is particularly useful in recreational vehicles, but is useful in other applications as well.

In the above described embodiments, snap components are used to affix the faceplate to the height extension shell, instead of using screws as in conventional GFCI assemblies. This makes installation more convenient, saves installation time, and makes the faceplate easier to clean and maintain. It also enhances esthetic without sacrificing function.

While the present invention is described above using specific examples, these examples are only illustrative and do not limit the scope of the invention. It will be apparent to those skilled in the art that various modifications, additions and deletions can be made to the GFCI assembly of the present invention without departing from the spirit or scope of the invention.

What is claimed is:

1. A faceplate for use with a ground fault circuit interrupter (GFCI) device, including a front plate and a snap feature joined to the front plate, wherein the snap feature is configured to affix the faceplate to a height extension shell, wherein the snap feature includes a plurality of resilient snaps with hooks, the height extension shell includes a plurality of corresponding snap retaining recesses, and the snaps and the snap retaining recesses engage with each other to affix the faceplate to the height extension shell, the height extension shell being configured to accommodate a part of the GFCI device, wherein the front plate defines an opening that exposes at least a part of the GFCI device.

2. A ground fault circuit interrupter (GFCI) assembly, comprising:
- a ground fault circuit interrupter (GFCI) device;
- a height extension shell, configured to accommodate a part of the GFCI device; and
- a faceplate, which includes a plurality of resilient snaps configured to affix the faceplate to the height extension shell, wherein each resilient snap include a deformable prong with a hook at its end, and the height extension shell includes a plurality of corresponding snap retaining recesses, and the snaps and the snap retaining recesses engage with each other to affix the faceplate to the height extension shell, and wherein the faceplate defines an opening that exposes at least a part of the GFCI device.

3. The GFCI assembly of claim 2, wherein the height extension shell further includes multiple resilient arms located on a side of the height extension shell and configured to hold the GFCI device disposed within the height extension shell and restrain its movement relative to the height extension shell.

4. The GFCI assembly of claim 2, wherein the GFCI device is affixed to the height extension shell by threaded screws.

5. The GFCI assembly of claim 2, wherein the height extension shell is adapted to be affixed to a wall by threaded screws.

* * * * *